Nov. 28, 1967 P. W. HARLAND ETAL 3,355,068
DISPENSER HAVING MEANS TO POUR MAIN AND SUPPLEMENTAL
QUANTITIES OF LIQUIDS
Filed Oct. 24, 1965 7 Sheets-Sheet 1

INVENTORS
PHILIP W. HARLAND
MILTON MOLLICK
BY
Robertson Smythe Bryan & Parmelee
ATTORNEYS

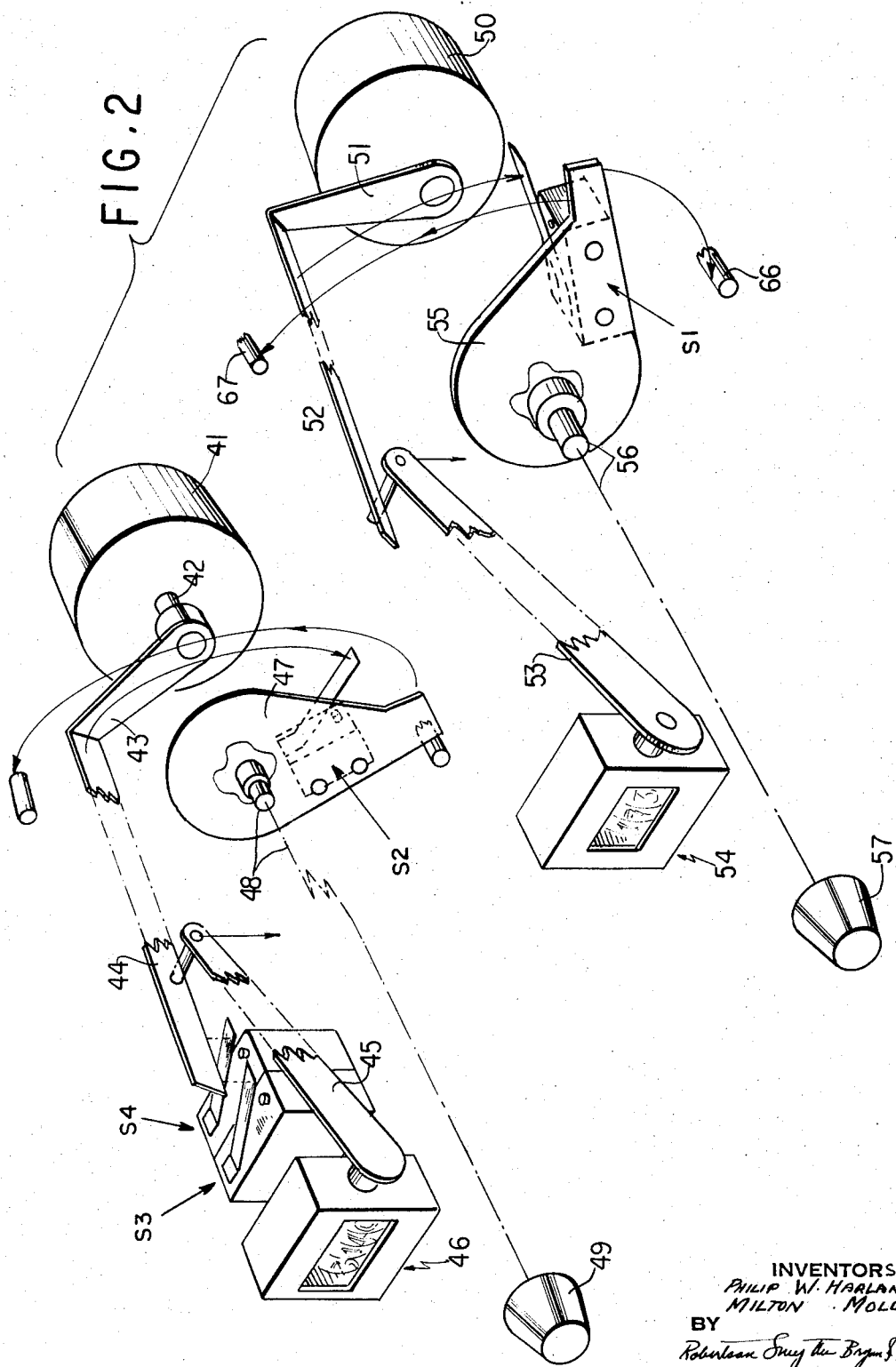

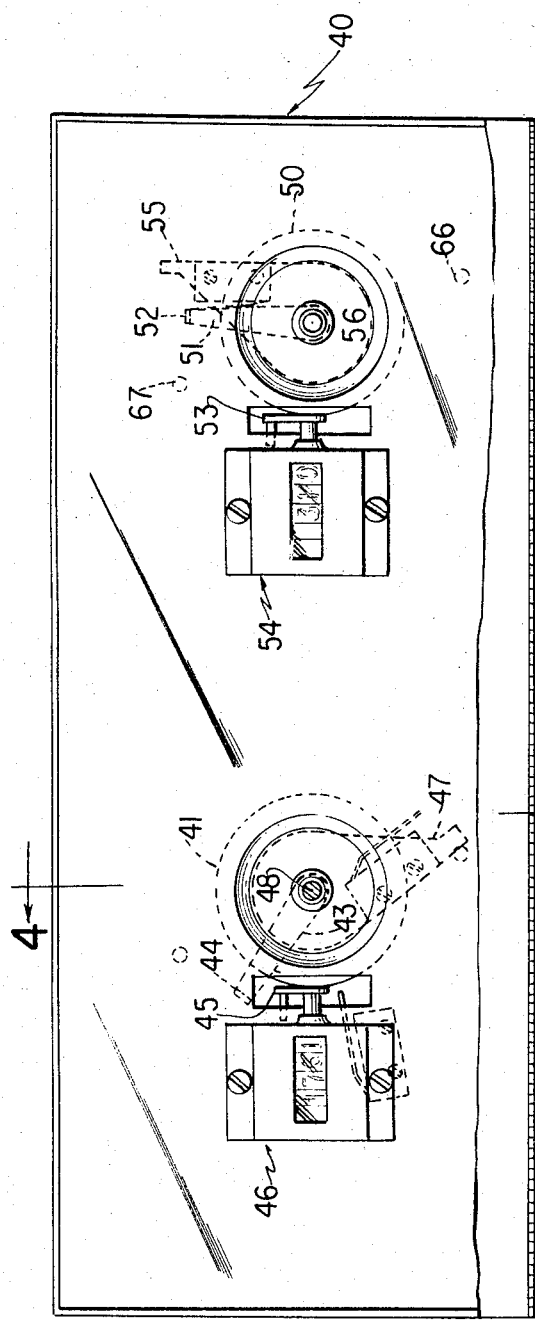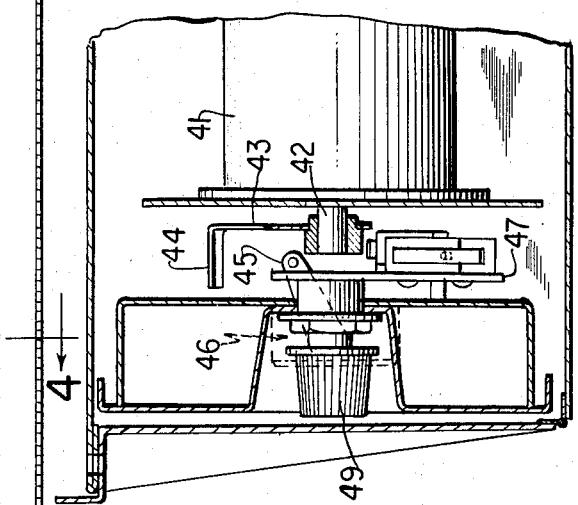

INVENTORS
PHILIP W. HARLAND
MILTON MOLLICK
BY
ATTORNEYS

INVENTORS
PHILIP W. HARLAND
MILTON MOLLICK
BY
ATTORNEYS

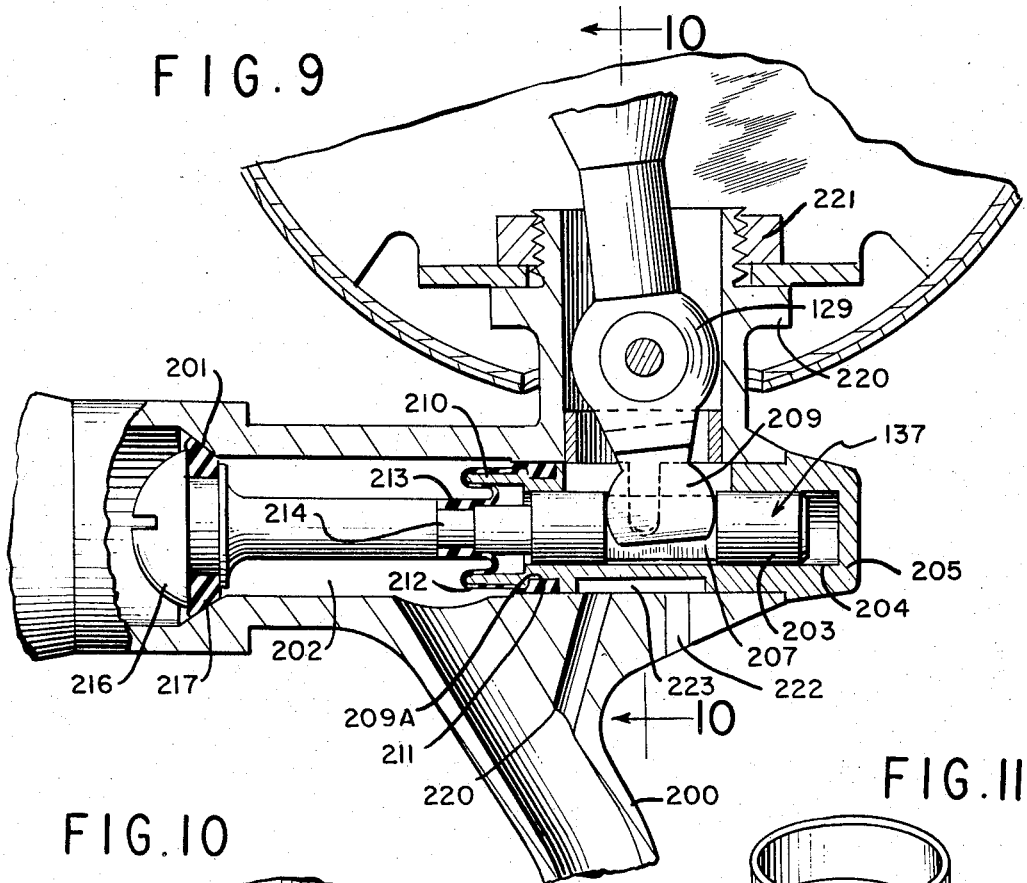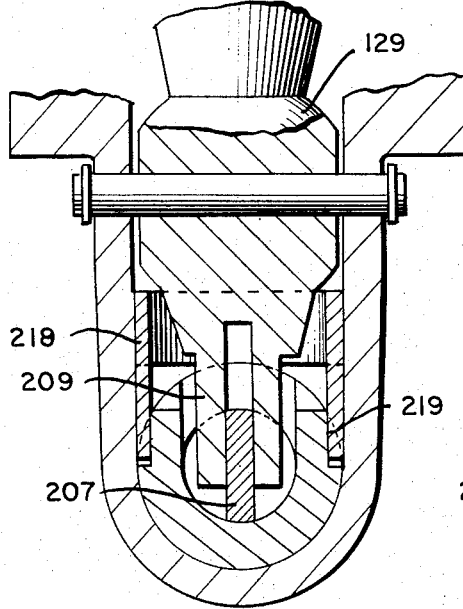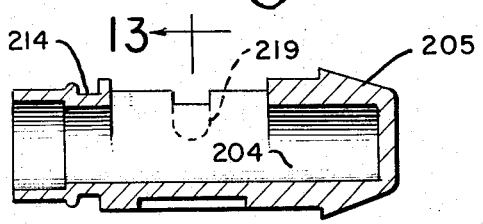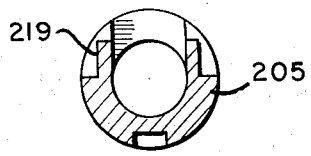

United States Patent Office 3,355,068
Patented Nov. 28, 1967

3,355,068
DISPENSER HAVING MEANS TO POUR MAIN AND SUPPLEMENTAL QUANTITIES OF LIQUIDS
Philip W. Harland, Perkasie, and Milton Mollick, Allentown, Pa., assignors to Ametek, Inc., New York, N.Y., a corporation of Delaware
Filed Oct. 24, 1965, Ser. No. 504,699
12 Claims. (Cl. 222—30)

ABSTRACT OF THE DISCLOSURE

A dispenser for beer or the like including means to pour a first main quantity of dispensed fluid initiated by, but thereafter independent of the operator, including means to add a supplemental quantity of dispensed fluid which is a predetermined percentage of said main quantity of fluid dispensed.

---

This invention relates to apparatus for controlling the dispensing of beverages such as beer or the like.

Problems arise in dispensing a predetermined measured amount of beer and other similar beverages that form a foaming head thereon. Frequently, but not every time such beverages are dispensed, a drawn glass of beer and the like requires a "topping" or supplemental quantity or head added before serving. Temperature, pressure variations, cleanliness of the unit and other factors are uncontrollable variables making dspensing of a fixed quantity difficult.

The principal object of this invention is to provide such an apparatus for controlling the dispensing of beer and other effervescent beverages.

Another object of the invention is to provide such an apparatus in which predetermined quantities of beer can be dispensed and a record made thereof.

Another object of the invention is to provide such an apparatus that will dispense a predetermined maximum supplementary quantity of beer or the like to give a supplemental or headed portion to the main dispensed quantity in order to fill the glass or receptacle, or to dispense a fixed predetermined supplementary quantity.

Still another object of the invention is to provide such an apparatus wherein adjustable means is provided so as to vary with ease the main quantity and the supplementary quantity of the dispensed beer.

In one aspect of the invention, the beer dispensing apparatus may comprise a spigot having a valve which, when opened, causes the flow of beer or the like through the spigot to a receptacle. The valve may be reciprocable and may be opened against the action of a spring by energizing a rotary or linear solenoid, torque stall motor, or the like that acts through linkage connecting it to the reciprocable valve. Energization of the solenoid or valve operator may be effected by the movement of a handle in one direction or to a first position for the main quantity.

In another aspect of the invention, a reversible main timing motor may be connected into the circuit of the rotary or linear solenoid, and adjustable means may be provided for varying the duration of the energization of the solenoid so as to vary the main quantity of beer dispensed, such being dependent upon the time the valve is open.

In still another aspect of the invention, means are provided for reversing the main timing motor for resetting it, and for operating a counting device to record the number of operations of the dispensing valve.

In a further aspect of the invention, means may be provided that becomes effective by moving the handle in the opposite direction to that for supplying the main quantity for energizing the solenoid to dispense a supplementary quantity of beer, so as to provide a headed quantity on the main quantity dispensed as generally is required in the dispensing of beer so as to thereby fill the glass or receptacle.

In a still further aspect of the invention, a separate reversing timing motor may be employed to control, through adjustable means, the duration of energization of the solenoid motor to control the supplementary quantity of beer dispensed. In addition, means may be provided for recording the number of operations of the supplementary dispensing mechanism.

The valve arrangement can be one wherein a flexible diaphragm or seal connected to the valve stem is assembled to the valve body so as to prevent the beer or fluid from reaching the slidable parts which might result in sticking.

The above, other objects and novel features of the invention will become apparent from the following specification and accompanying drawings which are merely exemplary.

In the drawings:

FIG. 2 is a schematic view of certain of the details of the apparatus shown in FIG. 1;

FIG. 3 is a front elevational view of the control box shown in FIG. 1;

FIG. 4 is a sectional view taken substantially along line 4—4 of FIG. 3;

FIG. 9 is a fragmentary sectional view of a preferred form of the valve assembly;

FIG. 10 is a fragmentary enlarged view taken along the line 10—10 of FIG. 9;

FIG. 11 is a perspective view of the lock means;

FIG. 12 is an enlarged view of the valve stem carrier;

FIG. 13 is a sectional view taken along the line 13—13 of FIG. 12; and

Figure 1:
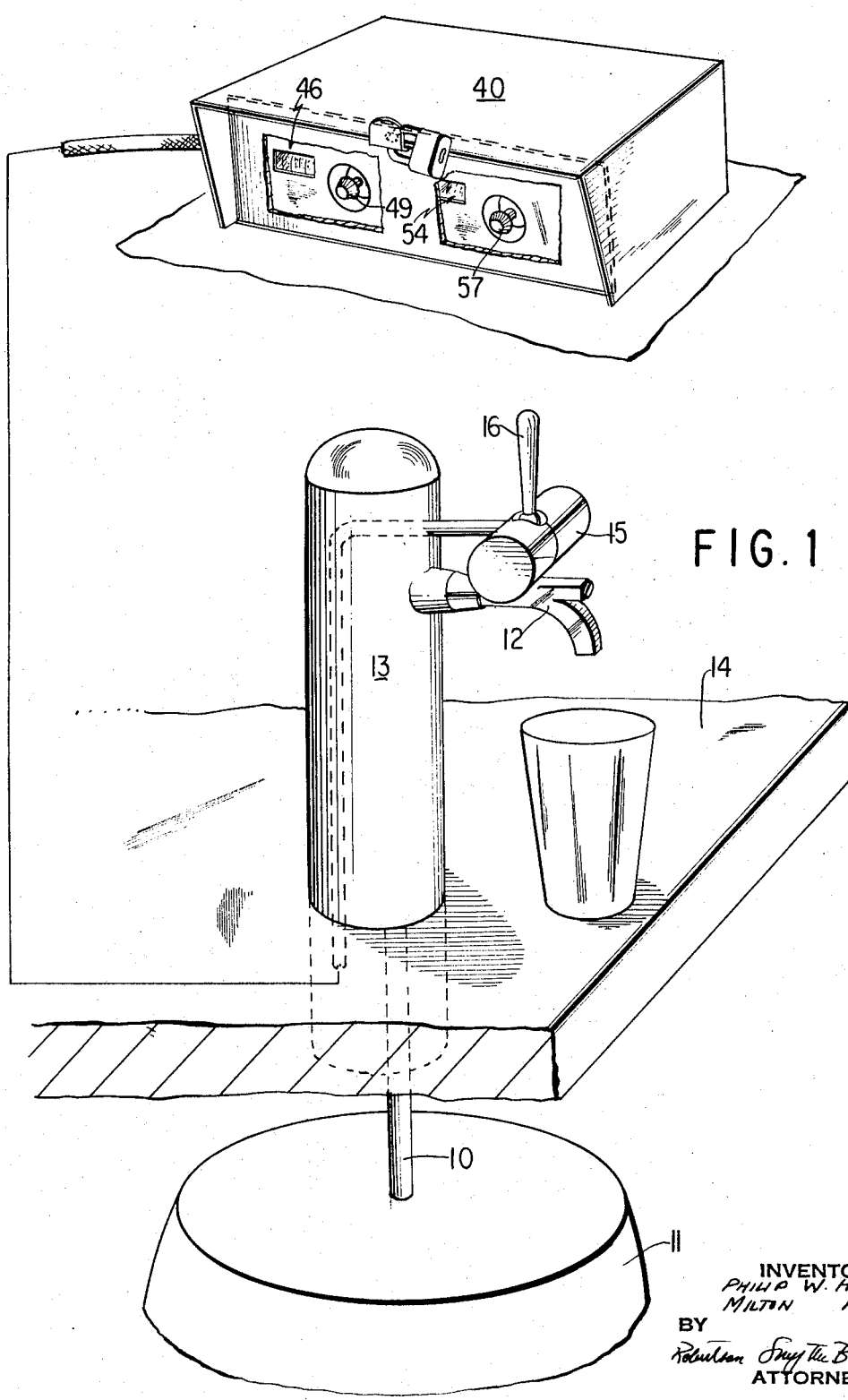
FIG. 1 is a perspective view of beer dispensing apparatus to which the principles of the invention have been applied.

Referring to the drawings, and particularly to FIG. 1, the principles of the invention are shown as applied to a conventional beer dispensing apparatus including a line 10 leading from a beer keg 11 to a spigot 12 that is attached to a standard 13 located on, and extending above, a bar or counter 14. A housing 15 may be mounted on the top of the spigot 12, and a handle 16 may extend vertically upwardly therefrom.

Figure 6:
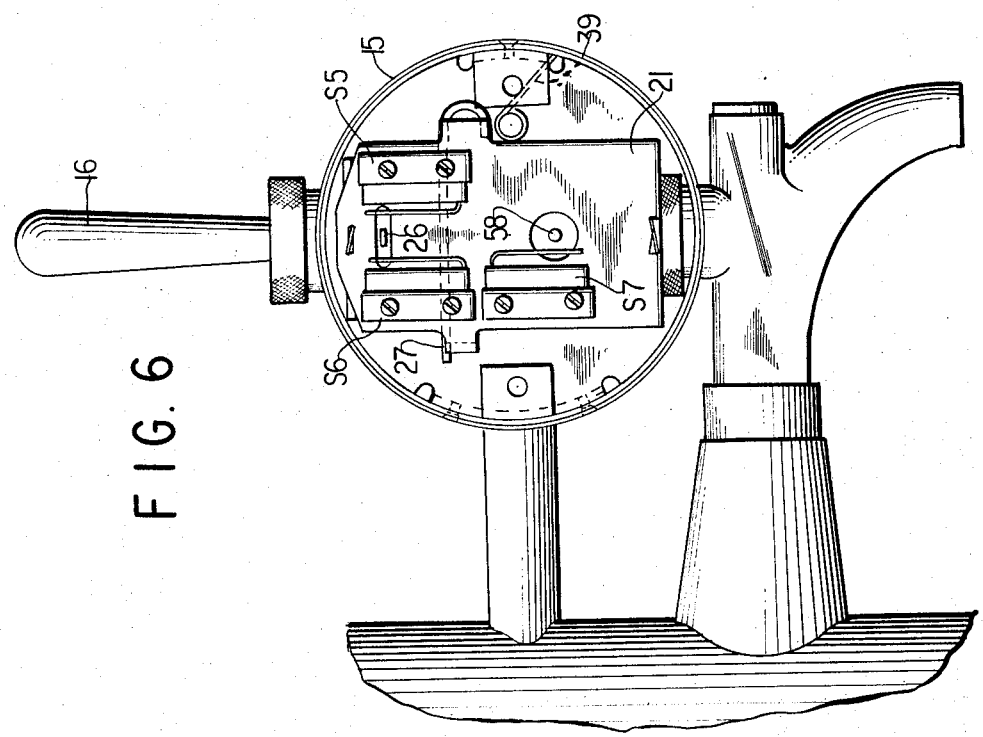
FIG. 6 is a sectional view taken substantially along line 6—6 of FIG. 5.
Figure 5:
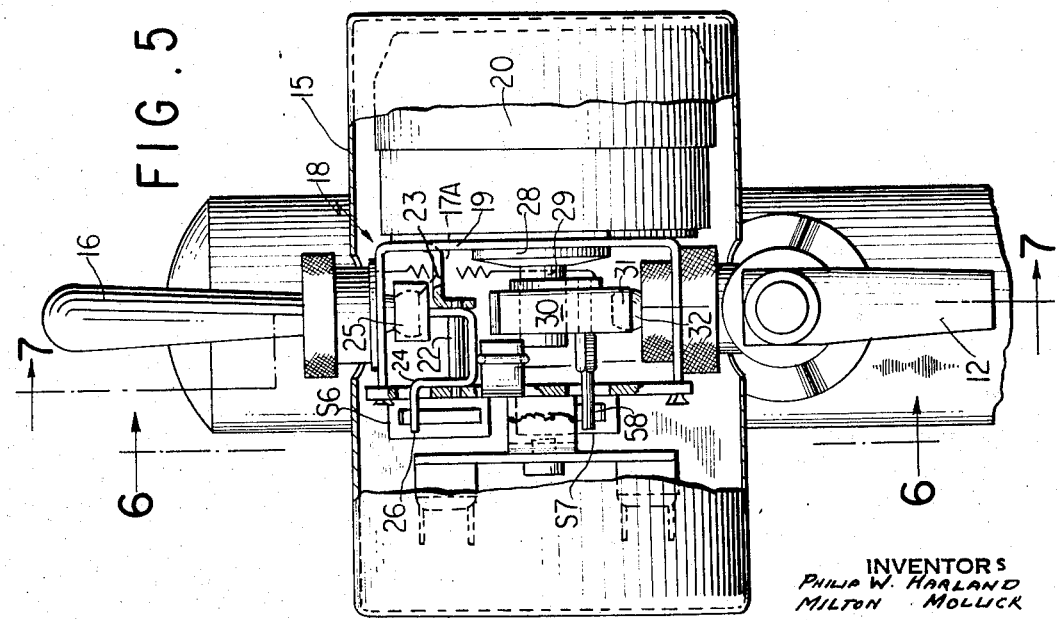
FIG. 5 is an enlarged view of a portion of FIG. 1, parts being broken away to show others.
Figure 7:
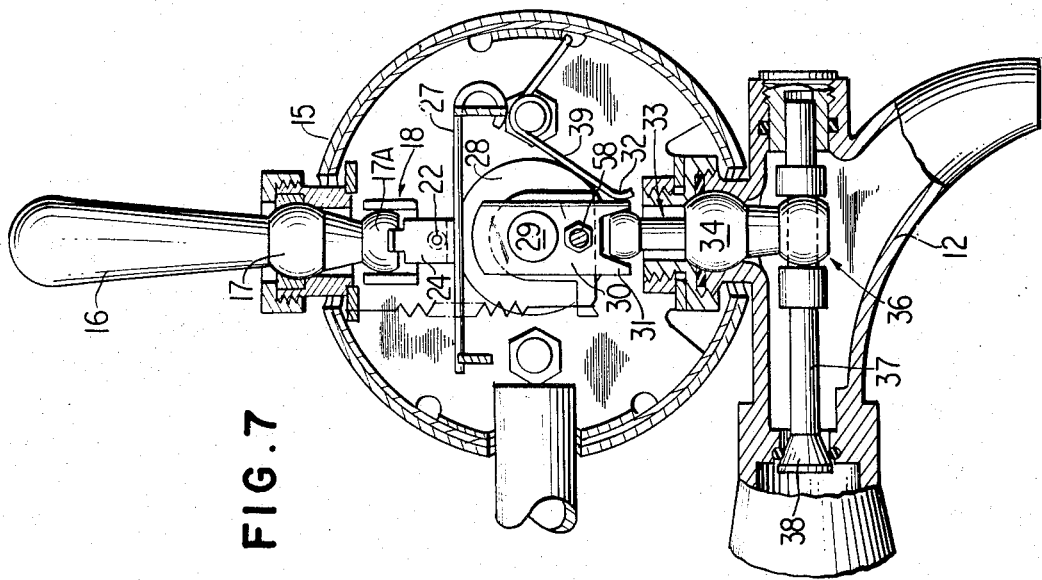
FIG. 7 is a sectional view taken substantially along line 7—7 of FIG. 5.

In the form shown in FIGS. 5, 6 and 7, the handle 16 may be provided with a spherical joint 17 intermediate its ends, and at the end opposite the gripping portion of handle 16 another connector 17A may be provided. The joint 17 may be mounted on a U-shaped frame member 18 having a wall 19 attached to a cover 20 within which a rotary solenoid or stall torque motor may be mounted for a purpose to be described later.

Frame member 18 may also include a plate 21 and a switch actuator shaft 22 (FIG. 5) that is located between aligned holes in plate 21 and a struck-out portion 23 of wall 19. A switch actuator 24 is rotatably suspended on shaft 22 and includes an arm 25 that engages the connector 17A. The actuator 24 also includes an arm 26 adapted to actuate a switch S6 when handle 16 is moved forwardly (FIG. 5) and rightwardly (FIGS. 6 and 7). Movement of handle 16 rearwardly causes arm 26 to actuate switch S5 (FIG. 6). A spring 27 acts on actuator 24 providing a spring detent action to the handle 16 normally retaining it in its central, vertical position.

Rotary means 28, which in the embodiment disclosed is a rotary solenoid but which could, with equal facility, be a stall torque motor or a linearly operable solenoid, has an output shaft 29 that fixedly supports a link 30 including a bifurcated end 31 that receives a spherical connector 32 at one end of a pivoted lever 33. Lever 33 includes a spherical joint 34 mounted within a seat 35 formed in the top of spigot 12. The lower end of lever 33 is bifurcated and contacts a spool formation 36 on a valve stem 37. Valve stem 37 includes a conical valve head 38 that opens and closes the outlet of spigot 12.

A leaf spring 39 within housing 15 normally acts to rotate link 30 in a clockwise direction thereby closing valve head 38 of the outlet for spigot 12.

Referring to FIGS. 1, 2, 3 and 4, a control box 40 may be provided for causing the cyclic actuation of valve head 38 to dispense main predetermined portions of beer as well as supplementary portions to add a head to the dispensed main portion.

Referring specifically to FIG. 2, a reversible motor 41, which in the embodiment shown is a 10 r.p.m. motor, is mounted within box 40. It may include an output shaft 42 to which a crank 43 is attached. Crank 43 may include an arm 44 that cooperates with normally closed switches S3 and S4. Arm 44 may also actuate a crank 45 of a counter 46 such as one having rotatable drums and which is non-resettable, such as one made by Veeder-Root, to record the number of operations of the motor 41. A reversing and resetting switch S2 for motor 41 may be mounted on plate 47 that is connected to a shaft 48 leading to the exterior of a front panel of box 40, and to the outer end of which a shaft knob 49 is attached. By adjustably locating plate 47 angularly, the position at which switch S2 is actuated may be changed, thus changing the duration of opening of valve head 38 to vary the main quantity of beer dispensed each time.

There may be another motor 50 within box 40, and it also may have a crank 51 connected to its output shaft. Motor 50 preferably rotates at a faster rate than motor 41, and in the embodiment disclosed, motor 50 rotates at 20 r.p.m. The crank 51 includes an arm 52 adapted to actuate a crank 53 of counter 54 to record the number of operations of motor 50.

Another plate 55 may be mounted within box 40, and it may support a normally closed switch S1 that will be opened by the arm 52 of crank 51. Plate 55 is connected to a shaft 56 that extends to the exterior of the box 40 and has a knob 57 thereon. Thus, adjustment of the rotary position of plate 55 determines the volume of supplementary beer added to the main dispensed volume when handle 16 is moved rearwardly (FIG. 5).

Referring to FIG. 9, the operator 129 is connected to valve stem shown generally at 137. The spigot 200 is at the end of the opening or passage 202. The valve stem may comprise an enlarged portion 203 which has a slidingly close fit with portion 204 of the stem carrying sleeve 205. The stem carrying sleeve 205 preferably is made of "Teflon" (polytetrafluoroethylene) which has non-sticking characteristics.

The enlarged portion 203 has a slotted or stepped portion 207 with a relatively thin web for receiving the bifurcated portion 209 of the valve operating means 129. Stem carrying means 205 preferably has a groove 209A therein for receiving the end of a seal element 210. The seal element may comprise a lip 211 which has an O-ring-like shape when in uncompressed condition. The portion 212 of the seal is a slack portion terminating in a ridge member 213. Ridge member 213 fits into the groove 214 of valve stem 137. The valve may include a threaded aperature (not shown) for receiving a valve button 216 which compresses or carries valve gasket 217 cooperating with the valve seat 201.

In order to assemble the unit, valve carrier 205 has the element 210 placed thereon. The valve stem 137 then is placed into the valve carrier 205, ridge member 213 being snapped into groove 214. The entire element then can be slipped into the body from the right (FIG. 9), the button 216 not being thereon at this time.

Key 218 is dropped into the two cut-outs 219 (FIG. 10) so as to lock the carrier 205 in position so that it cannot be axially or rotatably moved. The lock is held in place by valve 129 which is in turn held by nut 221 which is put into position within the valve body proper. When operator 129 is in place, it traps the valve stem 207 so that it cannot be turned nor can it be slid out of the valve body. Valve button 216 with its valve element 217 is then assembled so that a unitary structure is provided.

By use of this type of valve, the liquid or beer cannot enter the working parts of the valve stem and valve carrier, and this will prevent sticking or deposits being built up therein. Also, the structure provides an arrangement whereby the valve cannot be operated except by the electro-mechanical operating means and such will prevent liquid from being surreptitiously taken from the dispenser.

Figure 8:
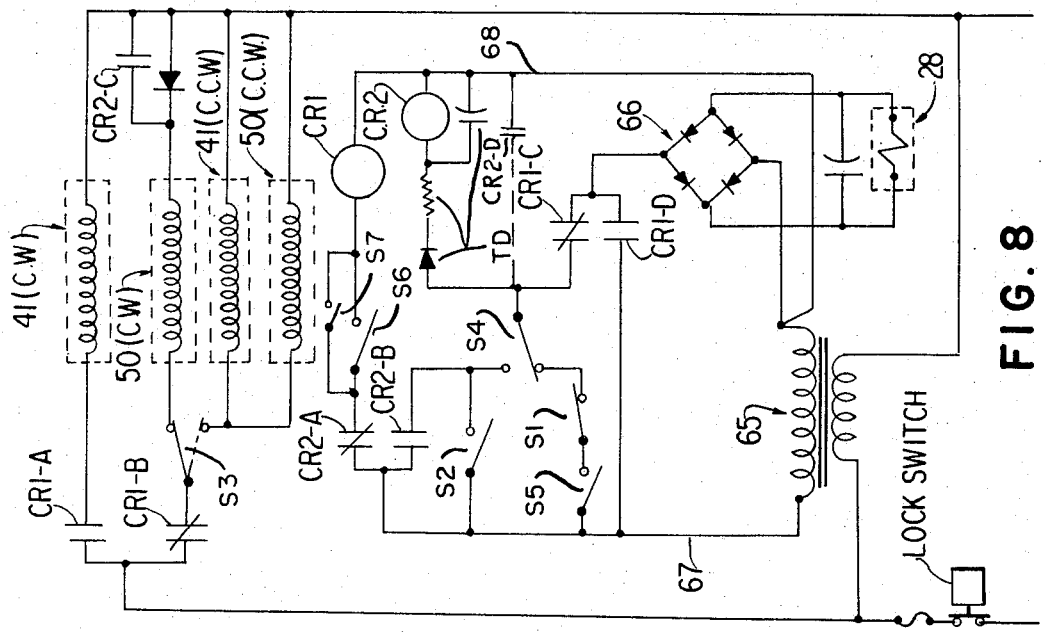
FIG. 8 is a wiring diagram of the electrical elements of the invention.

Referring to FIG. 8, the switches and circuits are shown when the handle 16 is in its neutral or rest position. Control D.C. is furnished from transformer 65 and rectifier 66 to the control bus leads 67, 68. In order to pour the main or "servings" quantity, handle 16 (FIGS. 6, 7) is pulled forward or to the right. This will close switches S6 and energize relay CR1 through switch CR2–A. Contacts CR1–A will close so as to energize the clockwise direction winding 41CW of motor 41 and CR1–B will open. Switch CR1–D will close to energize solenoid 28 to open the valve. Switch S6 is arranged so that it is kept closed when the solenoid 28 is energized so as to provide a holding circuit for the main pour cycle. As arm 44 moves upwardly (FIG. 2), switches S3 and S4 will move to the opposite contact of that shown in FIG. 8.

When arm 44 actuates switch S2, closing the same, relay CR2 will be energized through switch S4 so as to open CR2–A and thus de-energize relay CR1 and provide a holding circuit because switch CR2–B has been closed. Winding 41CCW of motor 41 will be energized through switch S3 and closed switch CR1–B and winding 41CW will be de-energized. The winding 50CCW of the 20 r.p.m. motor also will be energized through switch S3. The 10 r.p.m. motor 41 through its energized winding 41CCW will return arm 44 so as to open switches S3 and S4 and thus complete pouring of the main quantity of liquid. If handle 16 is in a rest position, the solenoid 28 will be de-energized and will stop pouring. If held or retained in forward position, another cycle will be started. Motor 50 through its energized winding 50CCW will stall against a stop and be ready for providing a full supplementary pouring part of the cycle if needed. The counter 46 through arm 45 will indicate a main pouring.

A switch S7 can be used so that if the valve is not permitted to close for any reason, such as insertion of a foreign article, S7 will be held closed by the valve actuator. Thus, even though the handle be released, the measuring counters will continue. In place of S7, an arm (not shown) could be extending upwardly so as also to operate S6 whenever the valve is displaced from closed position. Inasmuch as CR2–A will reclose faster than S7 can open, the time delay circuit TD will delay operation of CR2 to close CR2-A.

If a supplementary quantity is to be added, the handle 16 is pushed back or to the left (FIGS. 6, 7). This will close switch S5 which will complete a circuit to the solenoid or motor 28 and will energize relay CR2 through CR1-C. Energization of relay CR2 will energize 20 r.p.m. motor winding 50CW by closing contacts CR2-C. Motor 50 will continue operating as long as the handle 16 is kept in actuated position, until switch S1 is operated by arm 52 which will then stop the supplementary pour cycle. The indicator 54 also will be actuated to count one use of the supplementary pour cycle upon return to rest position in the next serving cycle as described above.

The handle 16 can be actuated a number of times during one supplementary pouring and still result in only one pouring count of the counter 54, such being up to the predetermined quantity. In other words, within the predetermined set supplementary pouring cycle, the total is not cumulative from one main cycle operation to the next main cycle operation.

Figure 14:
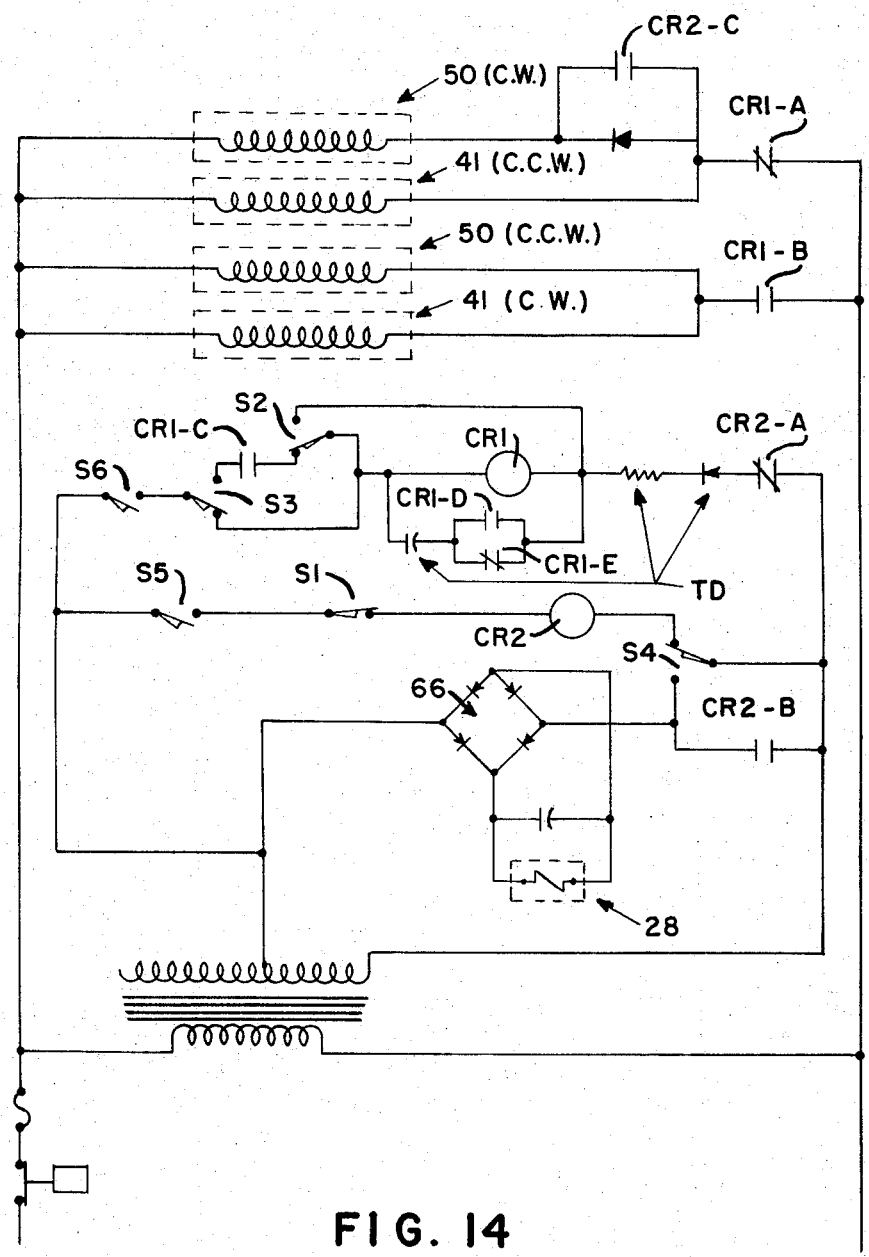
FIG. 14 is an alternate circuit diagram.

An alternative circuit is illustrated in FIG. 14 wherein coresopnding portions where similar have been given the same reference characters.

In FIG. 10, when handle 16 is operated, S6 is closed, energizing CR1 through switch S3 and closing CR1-B and opening CR1-A. This will energize 41CW and also energize 50CCW, the latter returning the arm 52 to rest position. Contacts CR1-C will close to provide a holding circuit through switches S2 and S3, the latter having moved upwardly (FIG. 14). As 41CW continues travelling clockwise, switch S4 will close. In this form, switch S4 is displaced upwardly (not shown), FIG. 2, relative to the path of travel of arm 44. It can be moved upwardly and turned sideways so that arm 44 will first contact it when moving counterclockwise or vice versa. Closing of switch S4 will cause energization of solenoid 28. When arm 44 changes S2, the holding circuit will break and relay CR1 will de-energize and will close CR1-A and open CR1-B so that the winding 41CCW is energized. Arm 44 will open S4 to de-energize the solenoid 28 and permit the valve to close. Winding 41CCW is still energized and will stall against switch S3 which is the end of the cycle. If the handle is held in activated position, the cycle will restart, there being a timed interval between operation of S4 and S3 by movement of the arm.

For the supplementary pouring cycle, operation of the handle 16 will close S5 to energize CR2 through S4 and S1. Contacts CR2-B will close, energizing solenoid 28. Contacts CR2-C also will close similar to FIG. 13 to energize winding 50CW. The remainder of the operation is similar to that described for FIG. 13, and time delay network TD provides a delay to permit switch S6 to be closed when S7 is closed due to solenoid 28 being opened. Contacts CR1-D and CR1-E are for the purpose of protecting the capacitor in the TD circuit.

In another aspect of the supplementary pouring feature, the circuit may be so arranged as to require the utilization of all of the supplementary quantity of liquid should the operator elect to use the supplementary serving. This can be accomplished by inserting a normally open contact CR2-D (FIG. 8) between the right side of CR2 and the left side of S4. In this way, CR2 remains energized until the entire supplementary cycle period is completed by the opening of S7.

It should be apparent that if desired, the handle 16 can be held in its forward or main pouring position manually or by detent feature to keep S6 closed so that after a cycle is completed, another will be initiated a short interval thereafter after return of the parts to the rest position. Time delay circuit TD produces a delay between pourings. The interval, for example, could be that needed to move another glass under the spigot.

Although the various features of the improved dispensing apparatus have been shown and described in detail to fully disclose one embodiment of the invention, it will be evident that changes may be made in such details, and certain features may be used without others, and that any fluid can be dispensed, without departing from the principles of the invention.

What is claimed is:

1. In a beer or the like dispensing apparatus, the combination including valve means for controlling flow of beer from a supply to a receptacle, valve actuating means operable to open said valve, handle means for initially controlling the energization of said actuating means to pour a first main measured quantity of beer independently of the operator, means associated with said handle means for further controlling the energization of said actuating means to selectively add a supplementary quantity of beer to said main quantity upon termination of the pouring of said first measured quantity which is a predetermined percentage of said main quantity, once each operation thereof.

2. An apparatus according to claim 1, including means for indicating the total number of operations of said valve means.

3. An apparatus according to claim 2 wherein the means for indicating the total number of operations for the supplemental quantity indicates only one operation per cycle of operation of the main quantity pouring.

4. An apparatus according to claim 3 wherein there may be a plurality of valve actuations for each supplemental quantity pouring.

5. An apparatus according to claim 2 wherein means is present in the means for operating the indicating means for continuing operation thereof when the valve means does not return to a closed position.

6. An apparatus according to claim 1 wherein the means for energizing the valve actuating means includes a timer means for pouring a timed quantity of beer.

7. An apparatus according to claim 6 wherein the timer means is a reversible motor.

8. An apparatus according to claim 1 wherein the means for energizing the valve actuating means is adjustable so as to vary the amount that can be dispensed at each operation.

9. An apparatus according to claim 1 wherein the said handle means is operable in a different direction for the supplemental quantity than for the main quantity.

10. In beer or the like dispensing apparatus, the combination including a linearly operated valve means for controlling flow of beer from a supply to a receptacle, a support, a handle on said support, electrically operable motor means on said support and connected to said valve means, a pair of switch means operable by said handle, and timing circuit means connected between said switch means and said motor means for opening said valve means a predetermined length of time when said handle is moved to a main quantity pouring position and when moved to a supplemental quantity position for opening said valve means to pour up to a predetermined percentage of the main quantity.

11. In beer or the like dispensing apparatus, the combination including a linearly operated valve means for controlling flow of beer from a supply to a receptacle, a support, a handle on said support, electrically operable motor means on said support and connected to said valve means, a pair of switch means operable by said handle, and timing circuit means connected between said switch means and said motor means for opening said valve means a predetermined length of time when said handle is moved to a main quantity pouring position and when moved to a supplemental quantity position for opening said valve means to pour up to a predetermined percentage of the main quantity, and only a desired quantity less than said predetermined percentage when moved out of the supplemental quantity position if released before the predetermined percentage is reached.

12. An apparatus according to claim 11 wherein indicating means count the number of operations of said valve means to pour the main quantity and to pour the supplemental quantity.

References Cited

UNITED STATES PATENTS

| | | | |
|---|---|---|---|
| 2,110,043 | 3/1938 | Hutsell | 141—94 X |
| 2,362,793 | 11/1944 | Ayars | 141—128 |
| 2,499,143 | 1/1949 | Irons | 141—94 |
| 2,660,351 | 11/1953 | Thompson | 141—102 |
| 2,752,083 | 6/1956 | Ullman et al. | 141—102 |
| 2,757,839 | 8/1956 | Carew | 141—102 |
| 2,928,573 | 3/1960 | Edelstein | 222—70 |
| 3,231,135 | 1/1966 | Starbuck et al. | 222—26 |

ROBERT B. REEVES, *Primary Examiner.*

HADD S. LANE, *Examiner.*